United States Patent
Yoon et al.

(10) Patent No.: US 11,257,606 B2
(45) Date of Patent: Feb. 22, 2022

(54) INTEGRATED CONDUCTIVE POLYMER BINDER COMPOSITION, METHOD FOR PREPARING THE BINDER COMPOSITION, AND APPLICATIONS COMPRISING THE BINDER COMPOSITION

(71) Applicant: INDUSTRY FOUNDATION OF CHONNAM NATIONAL UNIVERSITY, Gwangju (KR)

(72) Inventors: Hyeonseok Yoon, Gwangju (KR); Minjeong Kang, Jeollanam-do (KR)

(73) Assignee: INDUSTRY FOUNDATION OF CHONNAM NATIONAL UNIVERSITY, Gwangju (KR)

( * ) Notice: Subject to any disclaimer, the term of this patent is extended or adjusted under 35 U.S.C. 154(b) by 474 days.

(21) Appl. No.: 15/021,564

(22) PCT Filed: Sep. 16, 2014

(86) PCT No.: PCT/KR2014/008603
§ 371 (c)(1),
(2) Date: Mar. 11, 2016

(87) PCT Pub. No.: WO2015/041440
PCT Pub. Date: Mar. 26, 2015

(65) Prior Publication Data
US 2016/0225481 A1 Aug. 4, 2016

(30) Foreign Application Priority Data

Sep. 17, 2013 (KR) .................. 10-2013-0111561
Sep. 16, 2014 (KR) .................. 10-2014-0122540

(51) Int. Cl.
C09D 165/00 (2006.01)
H01B 1/12 (2006.01)
(Continued)

(52) U.S. Cl.
CPC ......... *H01B 1/127* (2013.01); *C08G 73/0266* (2013.01); *C08J 3/091* (2013.01);
(Continued)

(58) Field of Classification Search
CPC ......... C08K 5/053; C08L 65/00; C08L 79/02; C08G 2261/3221; C08G 2261/3223;
(Continued)

(56) References Cited

U.S. PATENT DOCUMENTS

2003/0032709 A1* 2/2003 Toshima ............... H01L 35/24
524/439
2006/0175582 A1* 8/2006 Hammond .......... H01L 51/5048
252/500

(Continued)

FOREIGN PATENT DOCUMENTS

CN 103189463 A 7/2013
JP 2008-001884 A 1/2008

(Continued)

OTHER PUBLICATIONS

M-cresol, Sigma Aldrich, retrieved Jun. 5, 2021. (Year: 2021).*

*Primary Examiner* — Callie E Shosho
*Assistant Examiner* — Krupa Shukla
(74) *Attorney, Agent, or Firm* — The PL Law Group, PLLC

(57) ABSTRACT

The present invention relates to a polymer binder composition, and more specifically, to an integrated conductive polymer binder composition simultaneously having adhesion and conductivity, a method for preparing the binder composition, an energy storage device comprising the binder composition, a sensor comprising a sensing portion formed from the binder composition, and an anticorrosive coating composition comprising the binder composition as an active component.

4 Claims, 7 Drawing Sheets

(51) Int. Cl.

| | | |
|---|---|---|
| *C09D 5/08* | (2006.01) | |
| *C09D 179/02* | (2006.01) | |
| *C09D 179/04* | (2006.01) | |
| *H01G 11/48* | (2013.01) | |
| *H01G 11/86* | (2013.01) | |
| *H01G 11/38* | (2013.01) | |
| *C08G 73/02* | (2006.01) | |
| *C08L 79/02* | (2006.01) | |
| *C08J 3/09* | (2006.01) | |
| *C08J 3/11* | (2006.01) | |
| *C09D 7/40* | (2018.01) | |
| *C08K 5/053* | (2006.01) | |
| *C09D 5/24* | (2006.01) | |
| *C08G 61/12* | (2006.01) | |

(52) U.S. Cl.
CPC ............... *C08J 3/11* (2013.01); *C08K 5/053* (2013.01); *C08L 79/02* (2013.01); *C09D 5/08* (2013.01); *C09D 5/24* (2013.01); *C09D 7/40* (2018.01); *C09D 165/00* (2013.01); *C09D 179/02* (2013.01); *C09D 179/04* (2013.01); *H01B 1/128* (2013.01); *H01G 11/38* (2013.01); *H01G 11/48* (2013.01); *H01G 11/86* (2013.01); *C08G 61/124* (2013.01); *C08G 2261/3221* (2013.01); *C08G 2261/3223* (2013.01); *C08G 2261/58* (2013.01); *C08G 2261/792* (2013.01); *C08G 2261/794* (2013.01); *C08G 2261/94* (2013.01); *C08J 2365/00* (2013.01); *C08J 2379/02* (2013.01); *Y02E 60/13* (2013.01)

(58) Field of Classification Search
CPC .......... C08G 2261/58; C08G 2261/792; C08G 2261/794; C08G 2261/94; C08G 61/124; C08G 73/0266; C08J 2365/00; C08J 2379/02; C08J 3/091; C08J 3/11; C09D 165/00; C09D 179/02; C09D 179/04; C09D 5/08; C09D 5/24; C09D 7/40; H01B 1/127; H01B 1/128; H01G 11/48; H01G 11/86

See application file for complete search history.

(56) References Cited

U.S. PATENT DOCUMENTS

| | | | |
|---|---|---|---|
| 2008/0149174 A1* | 6/2008 | Chen | B82Y 10/00 136/255 |
| 2009/0286097 A1* | 11/2009 | Yang | H01L 24/83 428/500 |
| 2010/0182734 A1* | 7/2010 | Ning | H01G 9/028 361/524 |
| 2012/0034453 A1* | 2/2012 | Kim | C08L 65/00 428/336 |
| 2012/0161080 A1* | 6/2012 | Jin | H01B 1/122 252/500 |
| 2012/0225283 A1* | 9/2012 | Uchimura | G02B 1/04 428/323 |
| 2012/0256117 A1* | 10/2012 | Sugawara | H01G 9/028 252/62.2 |
| 2012/0263209 A1* | 10/2012 | Panda | G01K 7/00 374/163 |
| 2013/0083405 A1* | 4/2013 | Trajkovska | H01B 1/125 359/642 |
| 2013/0306943 A1* | 11/2013 | Kato | C09J 139/06 257/40 |

FOREIGN PATENT DOCUMENTS

| | | | |
|---|---|---|---|
| JP | 2009-500832 A | 1/2009 | |
| KR | 10-2009-0010474 A | 1/2009 | |
| KR | 10-2013-0086352 A | 8/2013 | |
| KR | 10-2014-0122540 A | 9/2014 | |
| WO | WO-02059907 A1 * | 8/2002 | ............. H01B 1/128 |

* cited by examiner

INTEGRATED CONDUCTIVE POLYMER BINDER COMPOSITION, METHOD FOR PREPARING THE BINDER COMPOSITION, AND APPLICATIONS COMPRISING THE BINDER COMPOSITION

TECHNICAL FIELD

The present invention relates to a polymer binder composition, and more specifically, to an integrated conductive polymer binder composition simultaneously having adhesion and conductivity, a method for preparing the binder composition, an energy storage device comprising the binder composition, a sensor comprising a sensing portion formed from the binder composition, and an anticorrosive coating composition comprising the binder composition as an active component.

BACKGROUND ART

A binder provides binding strength between active materials, between the active material and a current collector, and between an electrode active material and a conductive material, and critically affects the electrical properties of a battery by suppressing the volumetric expansion caused by the charging/discharging of the battery. For such a binder resin, it is desirable to use a material that is insoluble with respect to an organic electrolytic solution in the battery, and is chemically stable, and thus conventionally, polyvinylidene fluoride (PVDF) has been widely used.

However, when an excessive amount of polymer is used as the binder to reduce the change in volume which occurs when charging/discharging, deintercalation of the active material from the current collector may be reduced, but since the electrical resistance in the negative electrode is increased due to the electrically insulating property of the binder and the amount of the active material is comparatively decreased, problems, such as a reduction in the capacitance, arise.

In order to solve such problems, proposals for using a conductive polymer such as polyacetylene or polyaniline, and the like, as a binder to improve the conductivity and reduce the internal resistance of a battery is disclosed in some prior art documents, and these are exemplarily described below.

Japanese Patent Application Laid-open Publication No. 2000-067918 discloses a lithium secondary battery formed by adding polyacetylene and/or polyaniline, and Japanese Patent Application Laid-open Publication No. 1989-132045 discloses an electrode in which polyaniline performs the functions of a binder and an active material at the same time and is mixed with polypyrrole and molded to form the electrode. Korean Patent Application Laid-open Publication No. 1999-031603 discloses a technique that minimizes interfacial resistance without a separate polymer binder in an electrode active material by attaching an electrode and the electrode active material using a conductive polymer as a medium. Moreover, Japanese Patent Application Laid-open Publication No. 1999-339774 discloses a positive electrode for a lithium secondary battery, the positive electrode being prepared by applying on carbon fiber a metal oxide as an active material and a polyaniline/ethanedisulfonic acid composite as a binder.

However, despite these various technical proposals, since in a typical conductive polymer material, the attractive force between molecules is comparatively strong and the attractive force between the solvent and the molecules is comparatively weak due to the van der Waals interaction between π electrons which are delocalized along the chain, the typical conductive polymer exhibits insolubility with respect to most widely used solvents, and thus suffers from the critical disadvantage of poor processability. In particular, the conductive polymer exhibits poor solubility in an organic solvent, and therefore has the problem of being difficult to use in a process for preparing an electrode by being mixed with an organic solvent such as NMP to prepare the electrode.

Moreover, since the electrical conductivity of the conductive polymer improves as the degree of polymerization increases, there is a problem in that a desired improvement in conductivity cannot be realized when the degree of polymerization is low, while conversely, the dispersibility in the solvent is reduced when the molecular weight is increased. Due to such numerous problems, the conductive polymer which as the binder exhibits the desired level of physical properties has not yet been developed.

Therefore, the need is high for a technique capable of simultaneously solving the many problems which can occur from adding, as a binder, a conductive polymer or a conductive material.

DISCLOSURE OF THE INVENTION

Technical Problem

Therefore, an object of the present invention is to provide an integrated conductive polymer binder composition having excellent durability and coating performance as the binder when compared to a conventional adhering technique, and also exhibiting a uniform conductivity, even as the sole coating, and to provide a method for preparing the binder composition.

Another object of the present invention is to provide an integrated conductive polymer binder composition which even by itself has excellent adhesion and conductivity when compared to a conventional method of adding a conductive additive to an insulating binder, and thus is not only convenient to use, but due to a simplification of the process, the production cost thereof may also be reduced, and to provide a method for preparing the binder composition.

Still another object of the present invention is to provide an integrated conductive polymer binder composition composed of nanoparticles and thus able to perform the role of a conductive matrix which can facilitate physically/electrically excellent intermolecular contact to thereby exhibit excellent electrochemical performance when various electrode active materials are used, and to provide a method for preparing the binder composition.

Still another object of the present invention is to provide a high capacitance energy storage device including a supercapacitor that contains an integrated conductive polymer binder composition which not only exhibits excellent performance as a self-electrode, but also completely fulfills the role of a conductive binder to increase the performance of the electrode.

Still another object of the present invention is to provide a sensor including a sensing portion formed from an integrated conductive polymer binder composition by using the property of the integrated conductive polymer binder composition, that is, the property of being both conductive and regenerative at the same time.

Still another object of the present invention is to provide an anticorrosive coating composition comprising, as an active component, an integrated conductive polymer binder composition that uses the property of the integrated conductive polymer binder composition of maintaining the conductivity of the metal itself while also maintaining or increasing the resistive property in a particular environment to have an excellent anticorrosive property, and to provide an anticorrosive conductive metal product comprising a coating layer formed from the anticorrosive coating composition.

Objects of the present invention are not limited to the above described objects, and other objects which are not described above will be clearly understood by a person of ordinary skill in the art from the descriptions below.

Technical Solution

In order to achieve the above-described object, the present invention provides an integrated conductive polymer binder composition comprising 80 wt % to 99.99 wt % of a conductive polymer solution and 0.01 wt % to 20 wt % of an organic compound that has multiple polar groups.

In an exemplary embodiment, the conductive polymer solution includes 0.01 wt % to 60 wt % of a conductive polymer, 0.01 wt % to 60 wt % of an alkyl group-substituted aromatic organic acid compound, and a remainder of solvent.

In an exemplary embodiment, the conductive polymer is at least one selected from the group consisting of polypyrrole, polyaniline, polythiophene, and derivatives thereof.

In an exemplary embodiment, the alkyl group-substituted aromatic organic acid includes at least one selected from the group consisting of camphorsulfonic acid (CSA), dodecylbenzene sulfonic acid (DBSA), polystyrenesulfonic acid (PSS), p-toluenesulfonic acid (PTSA), methanesulfonic acid (MSA), and naphthalene sulfonic acid (NSA).

In an exemplary embodiment, the solvent is water or an organic solvent, the organic solvent being at least one selected from the group consisting of N-methylpyrrolidone (NMP), dimethyl sulfoxide (DMSO), dimethylformamide (DMF), cresol, methyl ethyl ketone, chloroform, butyl acetate, xylene, toluene, and tetrahydrofuran (THF).

In an exemplary embodiment, the multiple polar groups included in the organic compound are multiple hydroxyl groups.

In an exemplary embodiment, the organic compound is at least one selected from the group consisting of D-sorbitol, D-fructose, D-glucose, saccharose, L-arabitol, xylitol, maltitol, isomalt, and erythritol.

The present invention also provides a method for preparing an integrated conductive polymer binder composition, the method comprising a solution preparing step for preparing a conductive polymer solution; an adding/mixing step for forming a mixed solution of the conductive polymer by adding an organic compound having multiple polar groups to the prepared conductive polymer solution; and a step for physically treating the mixed solution.

In an exemplary embodiment, the solution preparing step includes dissolving 0.01 wt % to 60 wt % of a conductive polymer and 0.01 wt % to 60 wt % of an alkyl group-substituted aromatic organic acid compound, in a remainder of solvent.

In an exemplary embodiment, the conductive polymer is at least one selected from the group consisting of polypyrrole, polyaniline, polythiophene, and derivatives thereof.

In an exemplary embodiment, the alkyl group-substituted aromatic organic acid includes at least one selected from the group consisting of camphorsulfonic acid (CSA), dodecylbenzene sulfonic acid (DBSA), polystyrenesulfonic acid (PSS), p-toluenesulfonic acid (PTSA), methanesulfonic acid (MSA), and naphthalene sulfonic acid (NSA).

In an exemplary embodiment, the solvent is water or an organic solvent, the organic solvent being at least one selected from the group consisting of N-methylpyrrolidone (NMP), dimethyl sulfoxide (DMSO), dimethylformamide (DMF), cresol, methyl ethyl ketone, chloroform, butyl acetate, xylene, toluene, and tetrahydrofuran (THF).

In an exemplary embodiment, the adding/mixing step includes mixing the organic compound having multiple polar groups with the prepared conductive polymer by adding 0.01 wt % to 20 wt % of the organic compound to 80 wt % to 99.99 wt % of the prepared conductive polymer.

In an exemplary embodiment, the organic compound is at least one selected from the group consisting of D-sorbitol, D-fructose, D-glucose, saccharose, L-arabitol, xylitol, maltitol, isomalt, and erythritol.

Moreover, the present invention provides an energy storage device, comprising any one of the above-described integrated conductive polymer binder compositions or the integrated conductive polymer binder composition prepared through any one of the above-described preparation methods.

In an exemplary embodiment, the energy storage device is a supercapacitor.

In addition, the present invention provides a sensor comprising a sensing portion formed from any one of the above-described integrated conductive polymer binder compositions or the integrated conductive polymer binder composition prepared through any one of the above-described preparation methods.

In an exemplary embodiment, the sensing portion senses a poisonous gas.

Moreover, the present invention provides an anticorrosive coating composition comprising, as an active component, any one of the above-described integrated conductive polymer binder compositions or the integrated conductive polymer binder composition prepared through any one of the above-described preparation methods.

Furthermore, the present invention provides an anticorrosive conductive metal product having, on the surface thereof, a coating layer formed from an anticorrosive coating composition.

In an exemplary embodiment, the coating layer has a corrosion protection efficiency of at least 30% with respect to a 0.1 M sodium sulfate ($Na_2SO_4$) electrolyte.

Advantageous Effects

According to an integrated conductive polymer binder composition of the present invention, has excellent durability and coating performance as the binder when compared to a conventional adhesive technique, and also exhibits a uniform conductive property even as the sole coating, and thus has both excellent adhesion and conductivity.

Moreover, according to an integrated conductive polymer binder composition and a method for preparing the same of the present invention, has excellent adhesion and conductivity by itself, when compared to using a method of adding a conductive additive to a conventional insulating binder, and thus is not only convenient to use, but the production cost may be reduced by simplifying the process.

Furthermore, an integrated conductive polymer binder composition of the present invention may be composed of numerous nanoparticles and perform the role of a conductive matrix, and thus when using various electrode active materials, an excellent physical/electrical intermolecular contact may be facilitated such that excellent electrochemical performance is exhibited.

In addition, according to the present invention, a high capacitance storage device comprising a supercapacitor comprising an integrated conductive polymer binder composition which exhibits excellent performance as a self-electrode and also completely fulfills the role of a conductive binder to increase the performance of the electrode may be provided.

Moreover, according to the present invention, a sensor comprising a sensing portion formed from an integrated conductive polymer binder composition may be provided by using a property of the integrated conductive polymer binder composition, that is, the property of being both conductive and regenerative.

Furthermore, according to the present invention, an anticorrosive coating composition comprising, as the active component, an integrated conductive polymer binder composition which exhibits an excellent anticorrosive performance by maintaining the conductivity of the metal itself while also maintaining or increasing a resistive property in a particular environment, and an anticorrosive conductive metal product having a coating layer formed from the anticorrosive coating composition may be provided.

MODE FOR CARRYING OUT THE INVENTION

Figure 1A:
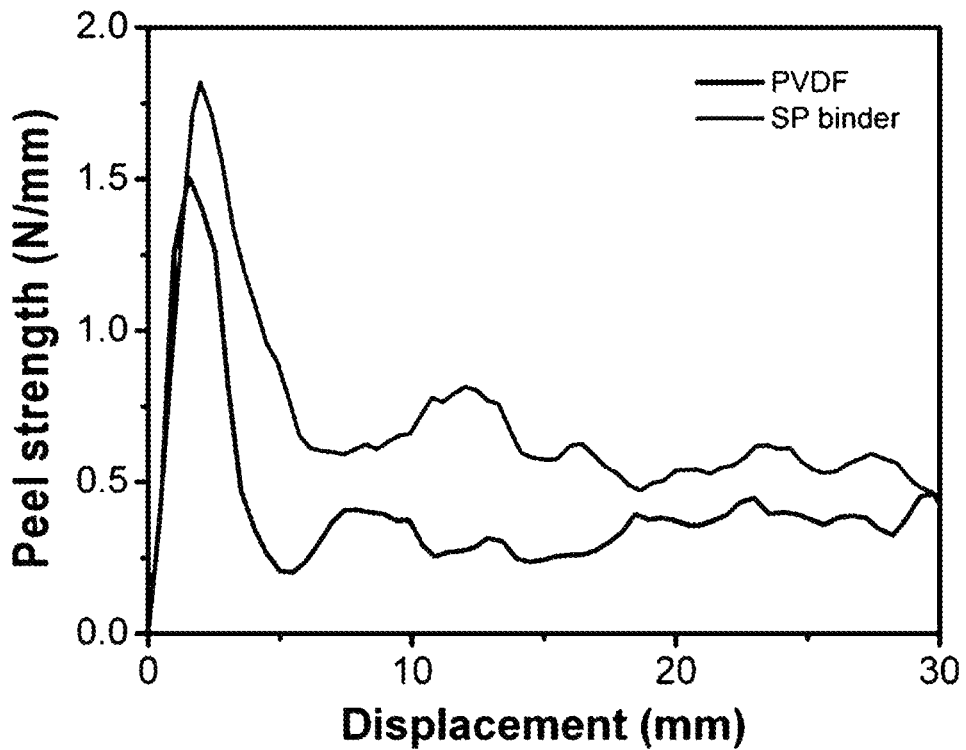
FIG. 1A is a graph illustrating, as a peel strength-displacement curve, the peel strength of an integrated conductive polymer composition obtained in an embodiment of the present invention.

When possible, common terms which are widely used today were selected in consideration of their function as the terms used in the present invention, but these may change according to the intent of those having ordinary skill in the art, juridical precedence, the appearance of new technology, etc. Moreover, in particular cases, a term may be arbitrarily selected by the applicant, and in such cases, the term is described in detail in the relevant part of the description of the invention. Therefore, terms used in the present invention shall be defined based on the definition of the term as well as on the overall description of the present invention, and not simply based on the definition of the term.

Hereinafter, the technical composition of the present invention is described in detail with reference to the accompanying drawings and preferred embodiments.

However, the present invention is not limited to the embodiments described herein, and may be embodied in other forms. Throughout the specification, like reference numerals used for describing the present invention refer to like elements.

With the present invention, since the intermolecular attractive force of a typical conductive polymer material is relatively strong, the technical feature relates to a conductive polymer solution with a composition that includes an alkyl group-substituted aromatic organic acid compound, which is capable of reducing the intermolecular attractive force and also of exhibiting adhesion with respect to a particular surface, and an integrated conductive polymer composition with a composition comprising the conductive polymer solution and an organic compound having multiple polar groups; and to method of preparing the same, and therefore the present invention is described in consideration of this point.

Thus, typically, since the intermolecular attractive force is relatively strong and the attractive force between the solvent and the molecule is weak, the conductive polymer material exhibits insolubility with respect to most widely used solvents, and thus suffers from the critical disadvantage of poor processability, but when, as with the present invention, the alkyl group-substituted aromatic organic acid compound having the function of a surfactant is used as a dopant, the part with the counter ion may act as a dopant to enable electrical conductivity to be exhibited, while the substituted alkyl group may exhibit solubility with respect to a widely used solvent or water, as well as adhesion to a particular surface through the van der Waals attractive force.

Moreover, when the conductive polymer solution with such a composition is treated with the organic compound having multiple polar (atomic group) groups, not only is an effect of increasing the electrical conductivity of the integrated conductive polymer binder exhibited, but adhesion may be provided through hydrogen bonding and dipole interaction.

Consequently, unlike a typical binder which only provides adhesion and is electrically insulating, the integrated conductive polymer binder composition of the present invention has both adhesion and conductivity, which performs the role of a conductive material, and thus, even without a separate additive, may act by itself as an integrated binder having two functions.

Therefore, the integrated conductive polymer binder composition of the present invention includes 80 wt % to 99.99 wt % of the conductive polymer solution and 0.01 wt % to 20 wt % of the organic compound that has multiple polar groups.

The conductive polymer solution included in the integrated conductive polymer binder composition of the present invention may contain 0.01 wt % to 60 wt % of the conductive polymer, 0.01 wt % to 60 wt % of the alkyl group-substituted aromatic organic acid compound, and a remainder of solvent. Thus, this is because when the conductive polymer content and the content of the alkyl group-substituted aromatic organic acid are below the prescribed range, the intermolecular attractive force is not weakened and thus the solubility is reduced and the electrical conductivity is low, and conversely, when the prescribed range is exceeded, the unreacted product which could not be doped remains in the solution due to solution being in a saturated state, and thus the electrical properties are degraded.

Moreover, the alkyl-group substituted aromatic organic acid compound included in the conductive polymer solution of the present invention, which is an aromatic organic acid compound in which the alkyl group is substituted, is not limited but may include at least one selected from the group consisting of camphorsulfonic acid (CSA), dodecylbenzene sulfonic acid (DBSA), polystyrenesulfonic acid (PSS), p-toluenesulfonic acid (PTSA), methanesulfonic acid (MSA), and naphthalene sulfonic acid (NSA).

Furthermore, the solvent included in the conductive polymer solution of the present invention may be water or an organic solvent. In particular, in the case of being the organic solvent, all widely known organic solvents may be used, but in particular, may be at least one selected from the group consisting of N-methylpyrrolidone (NMP), dimethyl sulfoxide (DMSO), dimethylformamide (DMF), cresol, methyl ethyl ketone, chloroform, butyl acetate, xylene, toluene, and tetrahydrofuran (THF).

In addition, the organic compound which is included in the integrated conductive polymer binder composition of the present invention and is the compound having multiple polar groups functioning as donors and acceptors of a strong hydrogen bond may be used without limit, and is the element providing not only improved conductivity, but also improved adhesion to the conductive polymer dissolved in the conductive polymer solution. Specifically, the organic compound may be at least one selected from the group consisting of D-sorbitol, D-fructose, D-glucose, saccharose, L-arabitol, xylitol, maltitol, isomalt, and erythritol. Here, the organic compound that has the multiple polar (atomic group) groups and is a solid at room temperature may be used after being melted by applying heat to a temperature exceeding the melting point in order to improve the conductivity.

Next, looking at a method for preparing the integrated conductive polymer binder composition of the present invention, the method includes a solution preparing step for preparing the conductive polymer solution; an adding/mixing step for forming a soluble polymer mixed solution by adding the organic compound having multiple polar groups to the prepared conductive polymer solution; and a step for physically treating the mixed solution.

Here, in the adding/mixing step, stirring and/or ultrasonication may also be performed to form the mixed solution. Moreover, in the step for physically treating the mixed solution, all widely known physical treatment methods that act to enable the conductive polymer contained in the mixed solution to be physically doped with the organic compound may be used, but in the below-described embodiment, stirring and/or ultrasonication were performed at a laboratory scale. Here, stirring may be carried out for 1 minute to 60 minutes and ultrasonication may be carried out for 1 minute to 60 minutes. Here, the duration for which the step for physically treating the mixed solution is performed must be controlled well because when insufficiently carried out, that is, when the duration of physical doping is below the prescribed range, the alkyl group-substituted aromatic organic acid compound is not applied uniformly inside of the polymer, and thus the adhesive strength or electrical property is poor, and when carried out above the prescribed range, the adhesive properties of the obtained integrated polymer conductive binder composition can be degraded.

When the physical stirring or ultrasonication is performed as such, the soluble conductive polymer solution may be doped with the multiple polar groups of the organic compound to thereby prepare the integrated conductive polymer binder composition.

Next, looking at an energy storage device that includes the integrated conductive polymer binder composition of the present invention, as described above the integrated conductive polymer binder has superb electrical/physical intermolecular contact and by itself has excellent electrical properties, and thus, when used as a binder for holding an electrode, and the like, included in the energy storage device, may contribute to optimizing the electrical performance when compared to a conventionally used binder such as PVDF. Therefore, the integrated conductive polymer binder of the present invention may exhibit excellent performance as a self-electrode and also completely fulfill the role of a conductive binder when used as an electrode for a supercapacitor.

Next, a sensor of the present invention includes a sensing portion formed from the integrated conductive polymer binder composition, and the integrated conductive polymer binder composition of the present invention has both conductivity and regenerativity, and thus may be used as the sensing portion included in the sensor. For example, as described below, the integrated conductive polymer binder composition may sense fluids, comprising various chemical gasses that contain poisonous gasses such as ammonia, sarin gas, tabun gas, or hydrogen chloride, and the like, to measure a change in the resistance according to the type and concentration of a chemical substance, and thus may act as the sensing portion of the sensor.

Finally, an anticorrosive coating composition of the present invention and an anticorrosive conductive metal product, on the surface of which is a coating layer formed from the coating composition, make use of the integrated conductive polymer binder composition of the present invention maintaining the conductivity of the metal itself while also maintaining or increasing the resistive property in a particular environment to thereby have an excellent anticorrosive property. Thus, this is because when the anticorrosive coating layer is formed on the surface, the conductivity of the metal itself is maintained such that the inherent property thereof is not damaged, while at the same time, due to the anticorrosive coating layer, not only is an anticorrosive property realized, but elements which cause corrosion can be blocked to protect the metal. Therefore, when the anticorrosive coating composition is used to form the coating layer on the surface of the metal product of which the conductivity must be maintained and which is exposed to a severe environment, the anticorrosive coating composition is expected to maintain the performance of the metal product, on the surface of which is formed the coating layer, and also to contribute to extending the long lifetime of the metal product.

Example 1

Polymerization was carried out for 1 hour and 30 minutes by adding aniline and ammonium persulfate [$(NH_4)_2S_2O_8$] to 1 M hydrochloric acid solution at a molar ratio of 4:1. Next, the polymer was neutralized with 0.1 M ammonium hydroxide solution and then washed. 0.1 g of polyaniline obtained after drying, and 0.1 g of camphorsulfonic acid and 0.05 g of dodecylbenzene sulfonic acid as alkyl group-substituted aromatic organic acid compounds were mixed with 5 mL of N-methyl-2-pyrrolidone, which is an organic solvent, to thereby prepare a polyaniline solution.

The prepared polyaniline solution and D-sorbitol dissolved in NMP were stirred together for 15 minutes to thereby prepare a polyaniline mixed solution. The content of D-sorbitol contained in the polyaniline mixed solution was 0.3 wt %. Next, 15 minutes of ultrasonication was used to thereby prepare Integrated Polyaniline Binder Composition 1.

Example 2

Other than the content of D-sorbitol contained in the polyaniline mixed solution being 1 wt %, Integrated Polyaniline Binder Composition 2 was prepared through the same method as Example 1.

Example 3

Other than the content of D-sorbitol contained in the polyaniline mixed solution being 2 wt %, Integrated Polyaniline Binder Composition 3 was prepared through the same method as Example 1.

Example 4

Other than the content of D-sorbitol contained in the polyaniline mixed solution being 3 wt %, Integrated Polyaniline Binder Composition 4 was prepared through the same method as Example 1.

Example 5

Other than the content of D-sorbitol contained in the polyaniline mixed solution being 4 wt %, Integrated Polyaniline Binder Composition 5 was prepared through the same method as Example 1.

Example 6

Other than the content of D-sorbitol contained in the polyaniline mixed solution being 5 wt %, Integrated Polyaniline Binder Composition 6 was prepared through the same method as Example 1.

Example 7

Other than using maltitol dissolved in NMP instead of D-sorbitol dissolved in NMP, Integrated Polyaniline Binder Composition 7 was prepared through the same method as Example 1.

Example 8

Other than using maltitol dissolved in NMP instead of D-sorbitol dissolved in NMP, Integrated Polyaniline Binder Composition 8 was prepared through the same method as Example 2.

Example 9

Other than using maltitol dissolved in NMP instead of D-sorbitol dissolved in NMP, Integrated Polyaniline Binder Composition 9 was prepared through the same method as Example 3.

Example 10

Other than using maltitol dissolved in NMP instead of D-sorbitol dissolved in NMP, Integrated Polyaniline Binder Composition 10 was prepared through the same method as Example 4.

Example 11

Other than using maltitol dissolved in NMP instead of D-sorbitol dissolved in NMP, Integrated Polyaniline Binder Composition 11 was prepared through the same method as Example 5.

Example 12

Other than using maltitol dissolved in NMP instead of D-sorbitol dissolved in NMP, Integrated Polyaniline Binder Composition 12 was prepared through the same method as Example 6.

Example 13

After stirring pyrrole monomer together with camphorsulfonic acid and dodecylbenzene sulfonic acid in deionized water, ammonium persulfate (pyrrole/ammonium persulfate molar ratio=5), which was dissolved separately in deionized water, was slowly dropped in the above solution and then mixed for 12 hours. Next, the obtained polymer, that is, polypyrrole was washed. 0.1 g of dried polypyrrole, and camphorsulfonic acid and dodecylbenzene sulfonic acid used as alkyl group-substituted aromatic organic acid compounds were dissolved in 5 mL of m-cresol and then depressurized to thereby produce a polypyrrole solution.

The polypyrrole solution and L-arabitol dissolved in m-cresol were stirred together for 15 minutes to thereby prepare a polypyrrole mixed solution. The content of L-arabitol contained in the polypyrrole mixed solution was 0.3 wt %. Next, 15 minutes of ultrasonication was used to thereby prepare Integrated Polypyrrole Binder Composition 1.

Example 14

Other than the content of L-arabitol contained in the polypyrrole mixed solution being 1 wt %, Integrated Polypyrrole Binder Composition 2 was prepared through the same method as Example 1.

Example 15

Other than the content of L-arabitol contained in the polypyrrole mixed solution being 2 wt %, Integrated Polypyrrole Binder Composition 3 was prepared through the same method as Example 1.

Example 16

Other than the content of L-arabitol contained in the polypyrrole mixed solution being 3 wt %, Integrated Polypyrrole Binder Composition 4 was prepared through the same method as Example 1.

Example 17

Other than the content of L-arabitol contained in the polypyrrole mixed solution being 4 wt %, Integrated Polypyrrole Binder Composition 5 was prepared through the same method as Example 1.

Example 18

Other than the content of L-arabitol contained in the polypyrrole mixed solution being 5 wt %, Integrated Polypyrrole Binder Composition 6 was prepared through the same method as Example 1.

Example 19

A film-type sensing portion was formed from Integrated Polyaniline Binder Composition 1 obtained in Example 1. Next, a resistance sensor was produced by connecting a nickel electrode to the film-type sensing portion.

Example 20

An anticorrosive conductive copper plate, on the copper surface of which is a coating layer formed from Integrated Polyaniline Binder Composition 1 obtained in Example 1, was produced.

Example 21

An anticorrosive conductive zinc plate, on the zinc surface of which is a coating layer formed from Integrated Polyaniline Binder Composition 1 obtained in Example 1, was produced.

Experimental Example 1

A 180° peel test was performed in order to measure the adhesive strength of Integrated Polyaniline Binder Compositions 1 to 6 obtained in Examples 1 to 6, and the results thereof are illustrated in FIG. 1A (PVDF binder specimen: PVDF, Integrated Polyaniline Binder Composition 2 specimen: SP binder) and 1B.

For the specimen, a flexible film such as a polyimide film and a hard substrate such as a stainless steel panel were used. All of the adhesive testing was conducted using a method of peeling at a rate of 5 ram/min in a vertical direction while holding one of the specimens. The peel strengths of PVDF, which is a binder widely used in the electrochemical testing of a conventional capacitor or battery, and the like, and Integrated Polyaniline Binder Compositions 1 to 6 were compared, and the average values were calculated after performing a minimum of 10 tests. Typically, the value used as the result is obtained by dividing the average load with the width of the specimen, and is represented in N/mm.

From FIG. 1A, it may be observed that the adhesive strength of Integrated Polyaniline Binder Composition 2 obtained from Example 2 of the present invention is superior when compared to PVDF, which is a binder widely used in the electrochemical testing of a conventional capacitor or battery, and the like.

Figure 1B:
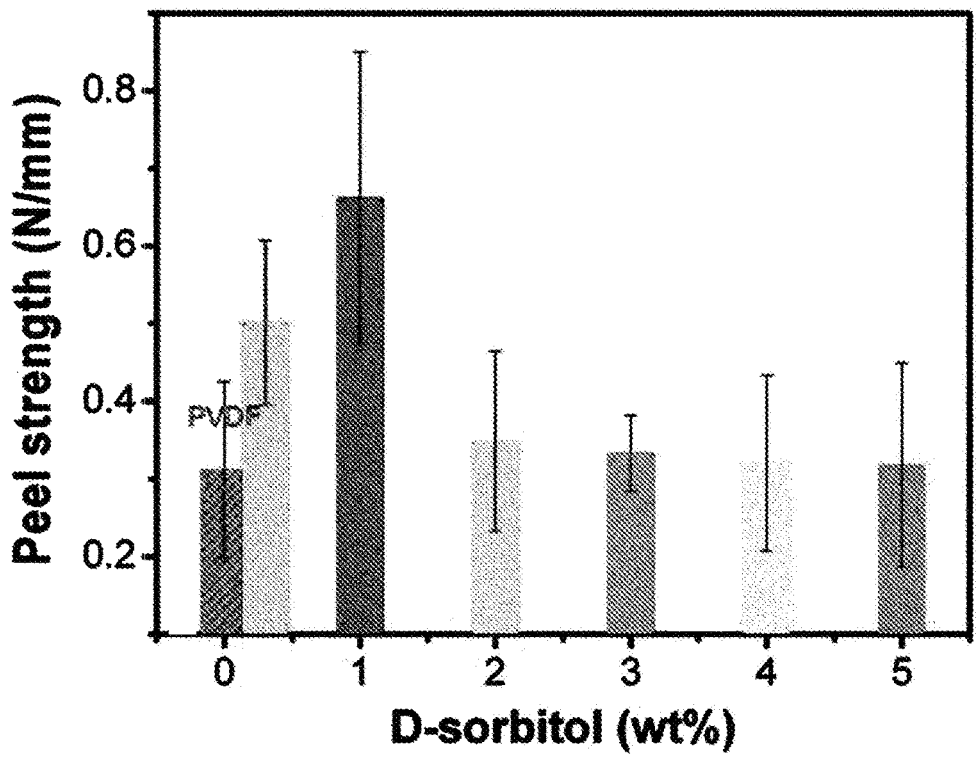
FIG. 1B is a graph comparing measurement results of peel strength according to D-sorbitol content of integrated conductive polymer compositions obtained in embodiments of the present invention.

From FIG. 1B, it may be observed that the best peel strength of 0.7 N/mm is exhibited when the content of D-sorbitol, which is included in the integrated conductive polymer composition of the present invention and has multiple polar groups, is 1 wt %. In particular, since a peel strength of 0.3 N/mm was exhibited by PVDF, which is the control group binder, the best peel strength was superior by at least a factor of 2.

The experimental results of FIGS. 1A and 1B demonstrate that when compared to PVDF, which is a widely used conventional binder, the integrated conductive polymer binder composition of the present invention is relatively superior in terms of peel strength.

Experimental Example 2

Figure 2A:
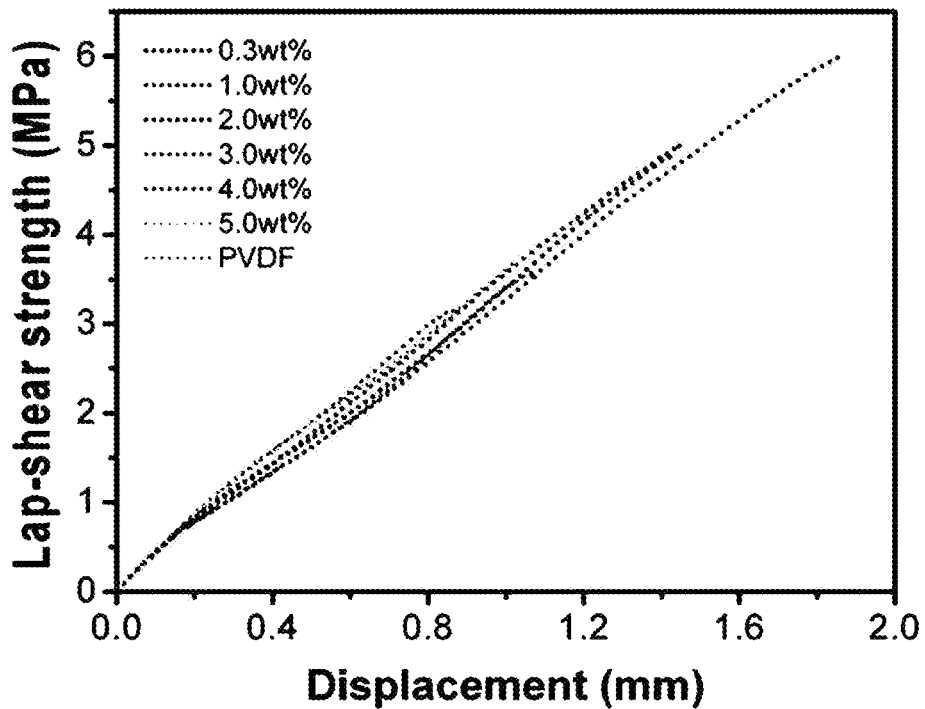
FIG. 2A illustrates representative strength-displacement curves.
Figure 2B:
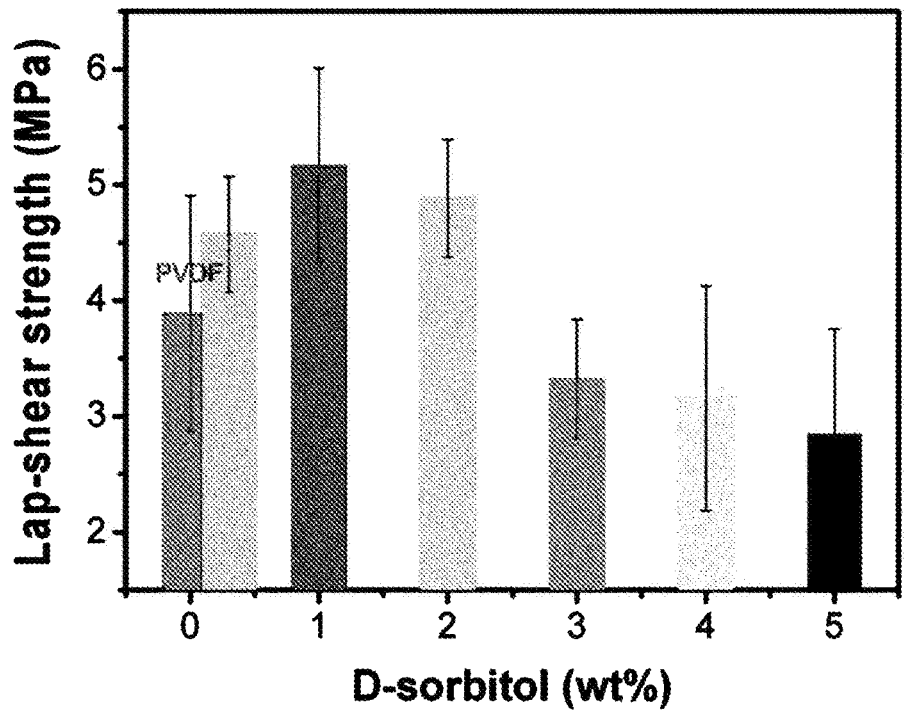
FIG. 2B is a graph comparing measurement results of lap-shear strength according to D-sorbitol content of integrated conductive polymer compositions obtained in embodiments of the present invention.

A lap-shear test was performed on Integrated Polyaniline Binder Compositions 1 to 6 obtained in Examples 1 to 6 in order to examine the adhesively bonded joint strength of two adhered specimens, and the results thereof are illustrated in FIGS. 2A and 2B.

For the test specimen, 3M PP2900 was used as a flexible film, and each of the binder compositions were used to adhere two specimens (overlapping area of 10 mm 13 mm). Moreover, in this test, which is a test for measuring the adhesive strength of a binder composition, the shear strength was measured by fixing the prepared specimen at the center of the grip, and slowly applying a tensile strength at a rate of 1.0 kg/min until the adhesion surface was disconnected. Here, the higher the shear strength, the better the adhesiveness.

FIG. 2A illustrates representative strength-displacement curves, and FIG. 2B is a graph comparing measurement results of the lap-shear strengths of Integrated Conductive Polymer Compositions 1 to 6, which respectively contain differing amounts of D-sorbitol from each other (Composition 1: 0.3 wt %, Composition 2: 1.0 wt %, Composition 3: 2.0 wt %, Composition 4: 3.0 wt %, Composition 5: 4.0 wt %, Composition 6: 5.0 wt %), and PVDF.

From FIGS. 2A and 2B, PVDF, which is the control group binder, exhibited an average adhesive lap-shear strength of 3.9 MPa, but in the case of the integrated polyaniline binder composition of the present invention, when the D-sorbitol content was at least 3 wt %, that is, in the case of Integrated Polyaniline Binder Compositions 3 to 6, a relatively low lap-shear strength was exhibited, but when the D-sorbitol content was 0.3 wt %, 1.0 wt %, or 2.0 wt %, that is, in the case of Integrated Polyaniline Binder Compositions 1 to 3, the lap-shear strength was observed to be 4.6 MPa, 5.2 MPa, and 4.9 MPa, respectively, and thus relatively much higher when compared to PVDF.

Experimental Example 3

Figure 3A:
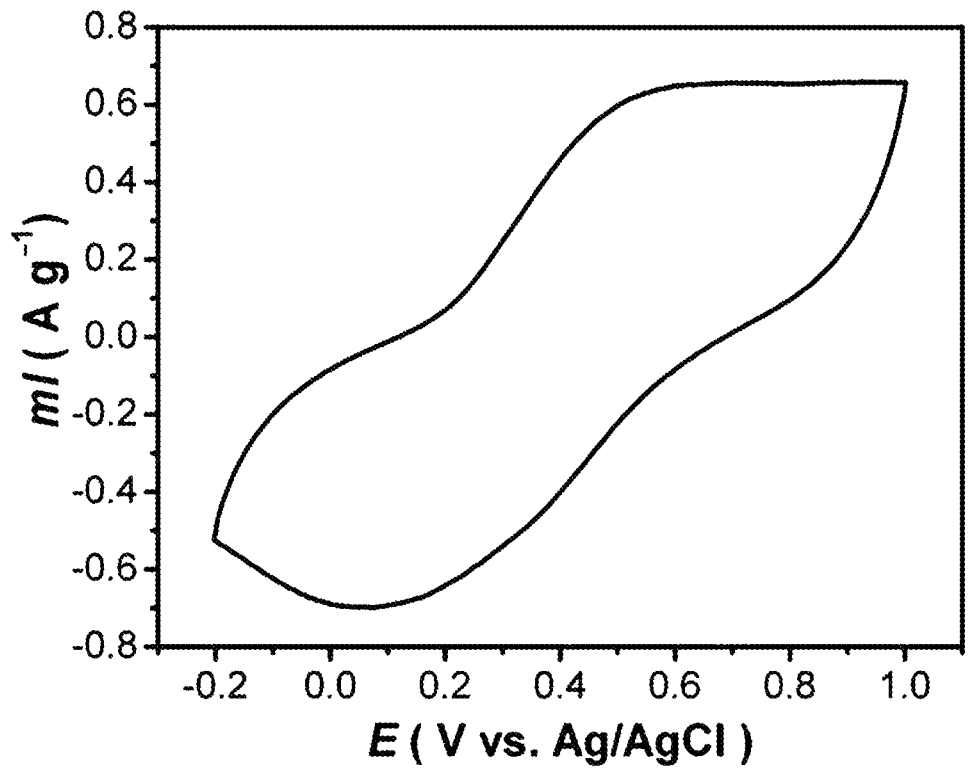
FIG. 3A is a CV graph of an integrated polyaniline binder composition obtained in an embodiment of the present invention.
Figure 3B:
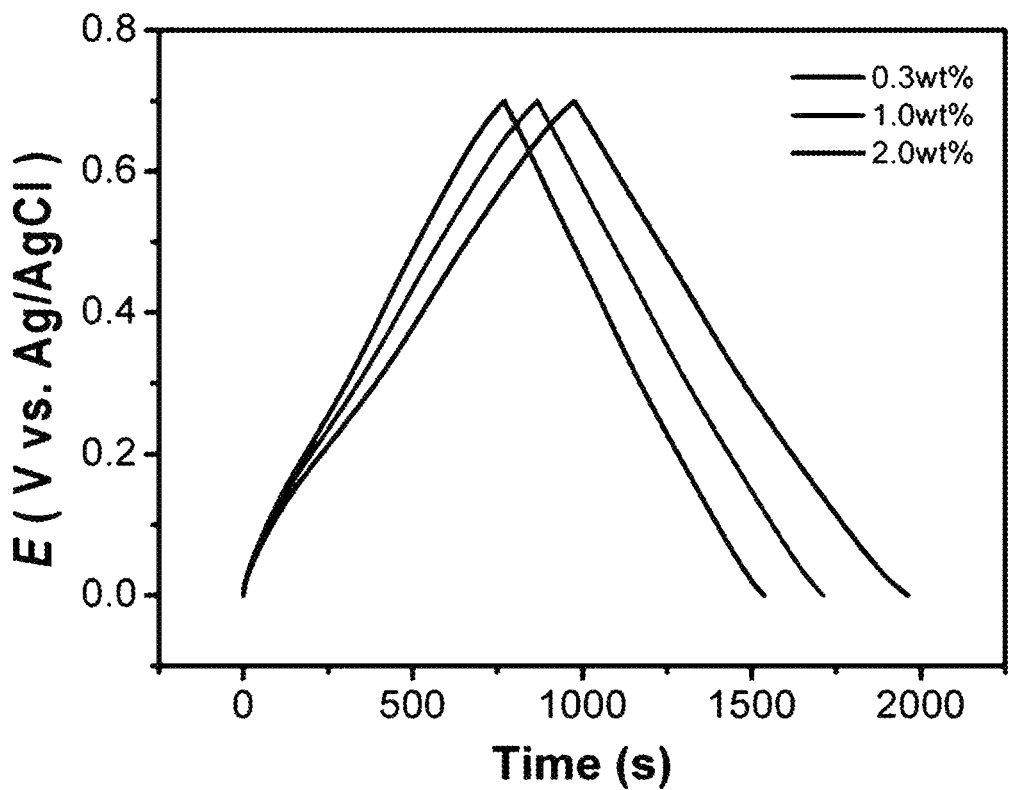
FIG. 3B is a graph showing that charge-discharge of the integrated polyaniline binder compositions obtained in embodiments of the present invention was realized in accordance to the voltage range.
Figure 3C:
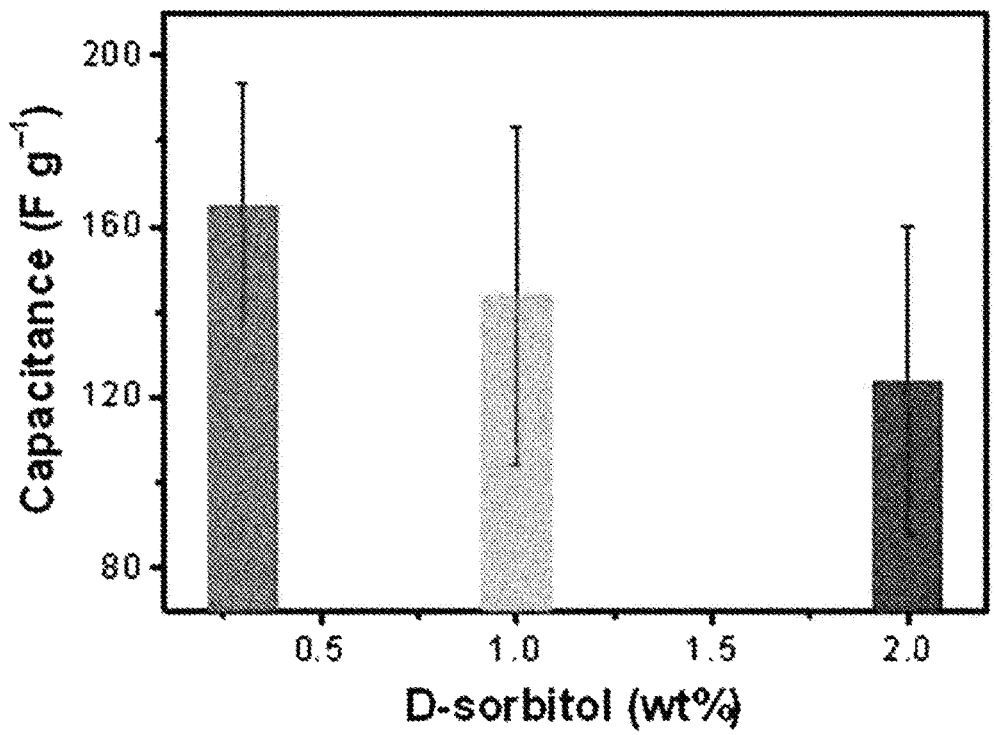
FIG. 3C is a graph illustrating the calculated discharge capacitance.

In order to observe the electrochemical properties of Integrated Polyaniline Binder Compositions 1 to 3 obtained in Examples 1 to 6, a three electrode cell was used to measure CV and CD, and the results thereof are illustrated in FIGS. 3A to 3C. For the CV measurement, the scanning rate was 25 mV/s, the voltage range was −0.2~1.0 V, and for the CD measurement, the current density was 0.1 A/g and the voltage range was 0~0.7 V. A 1 M sulfuric acid aqueous solution was used for the electrode, a Pt line was used for the counter electrode, and an Ag/AgCl electrode was used for the reference electrode.

As may be seen in FIG. 3A, the CV graph of the integrated polyaniline binder composition of the present invention exhibited the same properties as an oxidation/reduction peak of a typical polyaniline (emeraldine salt). The constant current charge-discharge test is a test for measuring the specific capacitance of the samples, and the voltage range of the charge-discharge test may be selected through the voltage range of the CV graph. As may be seen in FIG. 3B, all of the CD graph curves show that charge-discharge was realized in accordance with the voltage range. When the D-sorbitol content is 0.3 wt %, 1.0 wt %, and 2.0 wt %, that is, Integrated Polyaniline Binder Compositions 1 to 3, the capacitance is 165, 144, and 123 F g$^{-1}$, respectively, and as the D-sorbitol content in the integrated polyaniline binder increases, the capacitance decreases. However, the discharge capacitance for when the D-sorbitol content is 0.3 wt % or 1.0 wt % exhibited a similar result to the discharge capacitance of a conventional polyaniline (see FIG. 3C).

Experimental Example 4

Figure 4A:
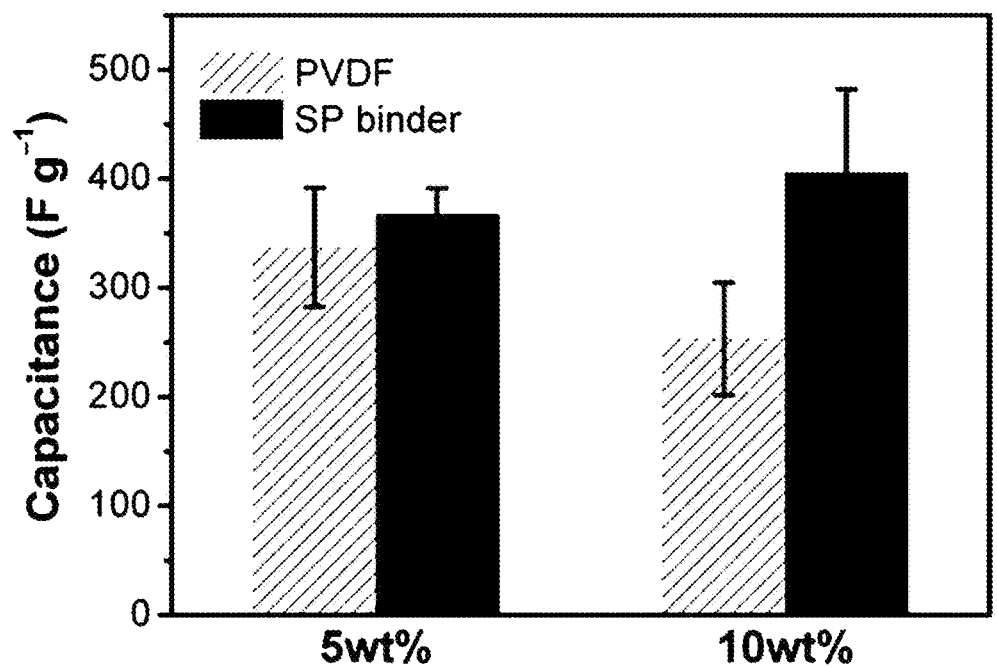
FIG. 4A is a graph of an analysis comparing the discharge capacitance of a polyaniline nanofiber electrode according to the content of an integrated polyaniline binder composition of the present invention, to the discharge capacitance of an electrode when a PVDF binder is used.
Figure 4B:
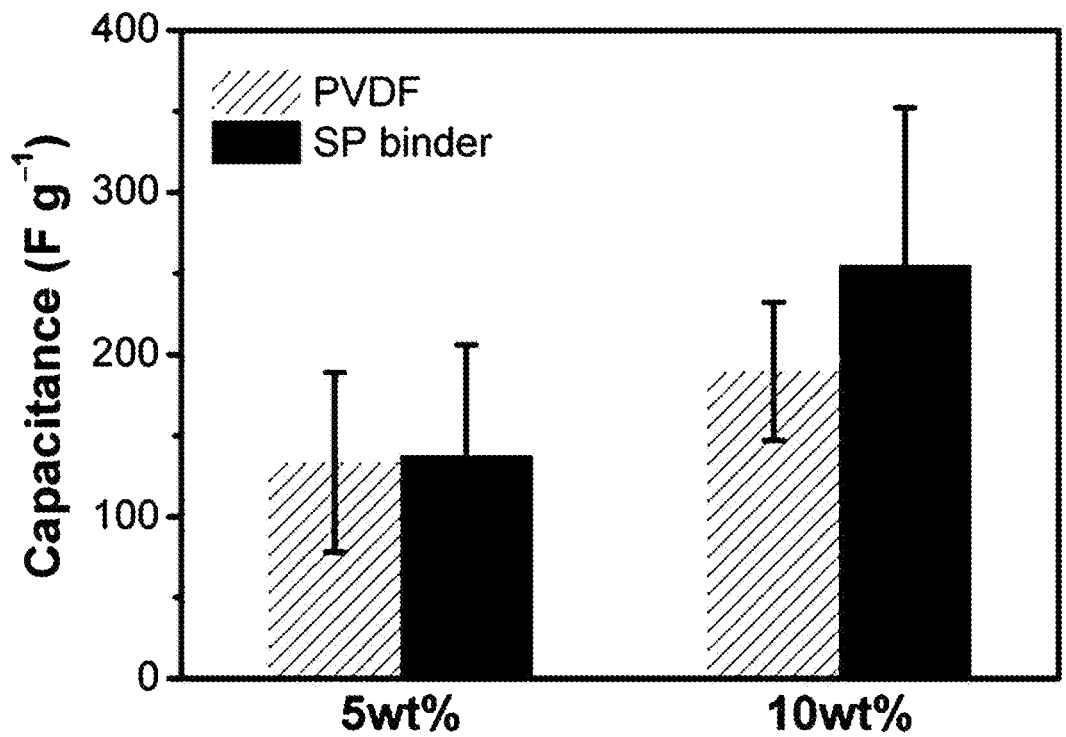
FIG. 4B is graph of an analysis comparing the discharge capacitance of a polypyrrole nanoparticle electrode according to the content of an integrated polyaniline binder composition of the present invention, to the discharge capacitance of an electrode when a PVDF binder is used.
Figure 4C:
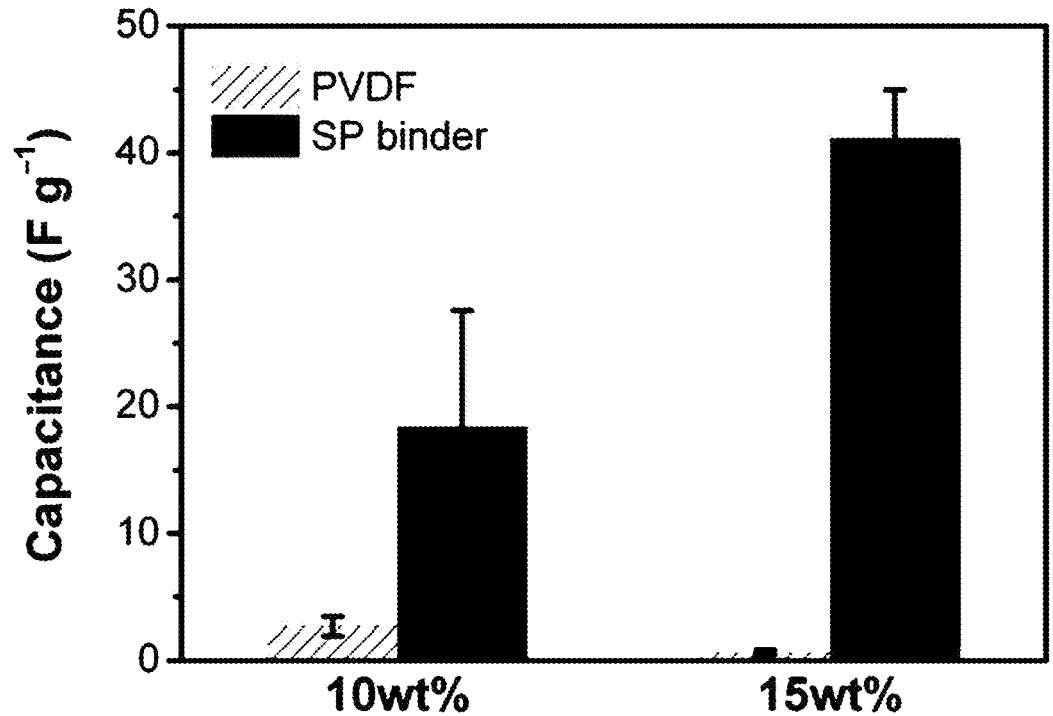
FIG. 4C is graph of an analysis comparing the discharge capacitance of a carbon black electrode according to the content of an integrated polyaniline binder composition of the present invention to the discharge capacitance of an electrode when a PVDF binder is used.

In order to examine what effect melting of the integrated conductive polymer composition of the present invention in an electrochemical capacitor has on increasing the capacitance, after measuring the capacitance by performing constant current charge-discharge testing of electrodes on various electrode materials (polyaniline, polypyrrole, and carbon black) in which Integrated Polyaniline Binder Composition 2 and PVDF binder were used, the results thereof were averaged and illustrated in FIGS. 4A to 4C. In the charge-discharge testing, the current density was 0.1 A/g and the three types of active materials were all measured in the voltage range of 0~0.7 V, like the conditions of the above charge-discharge testing. A 1 M sulfuric acid aqueous solution was used for the electrode, a Pt line was used for the counter electrode, and an Ag/AgCl electrode was used for the reference electrode.

This is because, as illustrated in FIG. 4A, when 5 wt % of the PVDF and Integrated Polyaniline Binder Composition 2 (SP binder) were used, the discharge capacitances of the polyaniline electrodes had values of 337.13 and 367.46 F/g, respectively, and when 10 wt % of the PVDF and SP binder were used, the discharge capacitances were observed to be 253.31 and 406.05 F/g, respectively.

In particular, in FIG. 4A, it was observed that the discharge capacitance is higher when Integrated Polyaniline Binder Composition 2 (SP binder) is used than when the PVDF binder is used, and also that the difference in discharge capacity from the electrode using PVDF increases as the content of Integrated Polyaniline Binder Composition 2 used in the electrode is higher, that is, the difference is larger when the content of Integrated Polyaniline Binder Composition 2 is 10 wt % than when it is 5 wt %.

Through FIGS. 4B and 4C, it may be observed that even when other active electrodes such as polypyrrole and carbon black are used, a higher discharge capacity is likewise exhibited when Integrated Polyaniline Binder Composition 2 (SP binder) is used.

Figure 5:
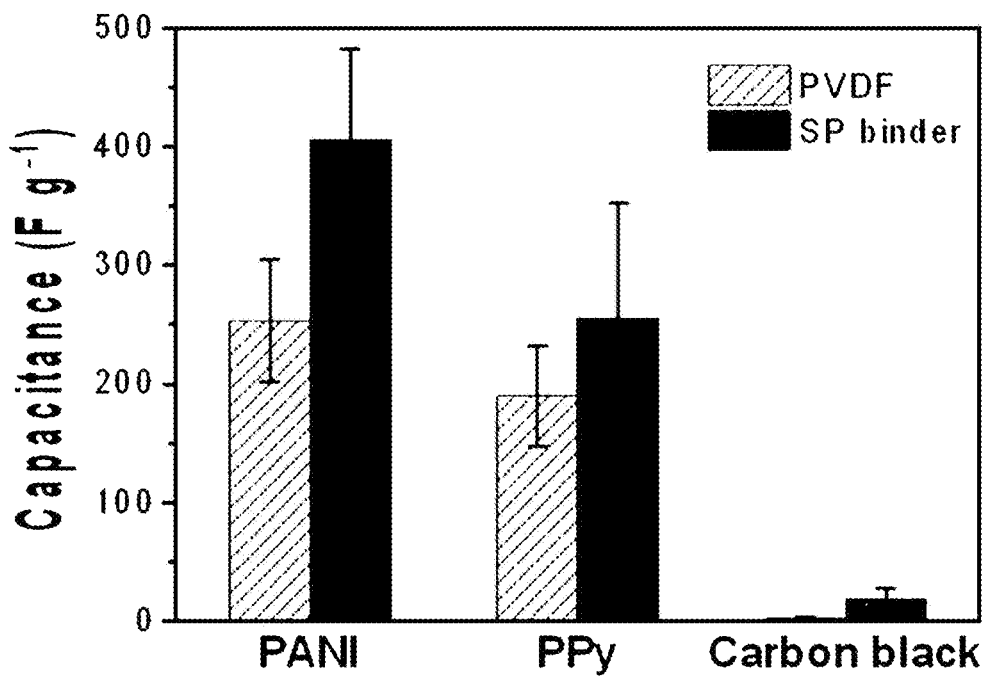
FIG. 5 is a graph illustrating, at the same scale and among the results obtained in FIGS. 4A to 4C, the discharge capacitance results for the polyaniline nanofiber, polypyrrole nanoparticle, and carbon black electrodes when the binder content is 10 wt %.

FIG. 5 is a graph illustrating, at the same scale and among the results obtained in FIGS. 4A to 4C, the discharge capacitance results for the polyaniline nanofiber (PANI), polypyrrole nanoparticle (PPy), and carbon black electrodes obtained when the content of PVDF and Integrated Polyaniline Binder Composition 2 (SP binder) used is 10 wt %. Referring to FIG. 5, it may be more clearly known that irrespective of the type of active electrode used, a higher discharge capacity than the discharge capacity of the electrode which used PVDF was exhibited when using Integrated Polyaniline Binder Composition 2 (SP binder).

From the above described experimental result, it may be known that PVDF is electrically insulating and thus inhibits an electrical connection to thereby hamper the electrical conductivity and also the electrical capacitance, that is, the electrical performance, but conversely, the integrated conductive polymer binder composition of the present invention has excellent electrical/physical intercontact between molecules, and by itself has superb electrical performance such that a synergy effect may be expected in the optimization of the electrical performance when used as a binder. Therefore, the integrated conductive polymer binder of the present invention exhibits outstanding performance as the self-electrode, and when used in an electrode for a supercapacitor, may increase the performance of the electrode by completely fulfilling its role as a conductive binder. Moreover, the integrated conductive polymer binder of the present invention may not only be used in the supercapacitor, but also in the adhesion of a battery, an LED, an LSI chip, or a photoconducting element, and the like, and thus may be an extremely useful binder that can replace a conventional binder.

Experimental Example 5

In order to confirm whether a sensing portion produced from an integrated binder composition of the present invention senses fluids such as a poisonous gas, and the like, reaction tests were performed on ammonia and hydrogen chloride using the resistance sensor produced in Example 19. Thus, 50 ppm of ammonia gas and 10 ppm of hydrogen chloride were introduced and reacted with the resistance sensor and the change in the resistance value was monitored, and in order to examine the reproducibility after the reaction, nitrogen gas was introduced and the resistance was confirmed to return to the initial resistance, and the results thereof are illustrated in FIGS. 5 and 6.

Figure 6:
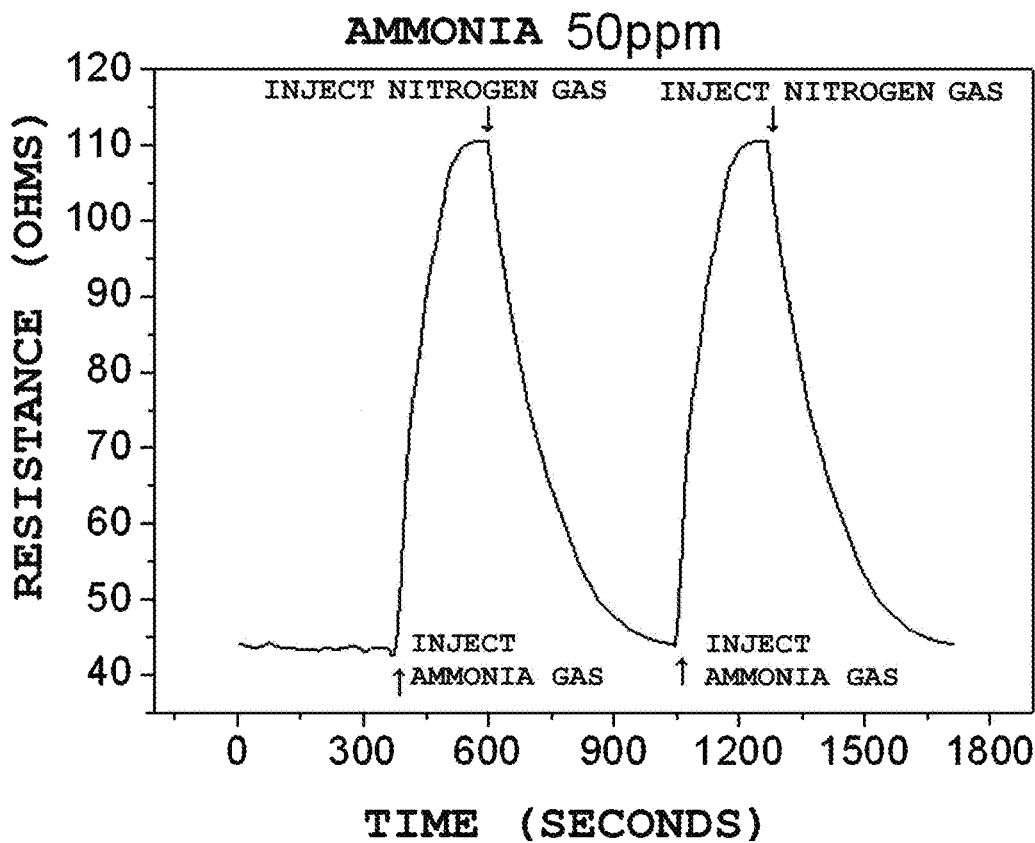
FIG. 6 is a graph illustrating the change in the resistance value when a sensor having a sensing portion formed from an integrated polyaniline binder composition obtained in an embodiment of the present invention is reacted with ammonia.
Figure 7:
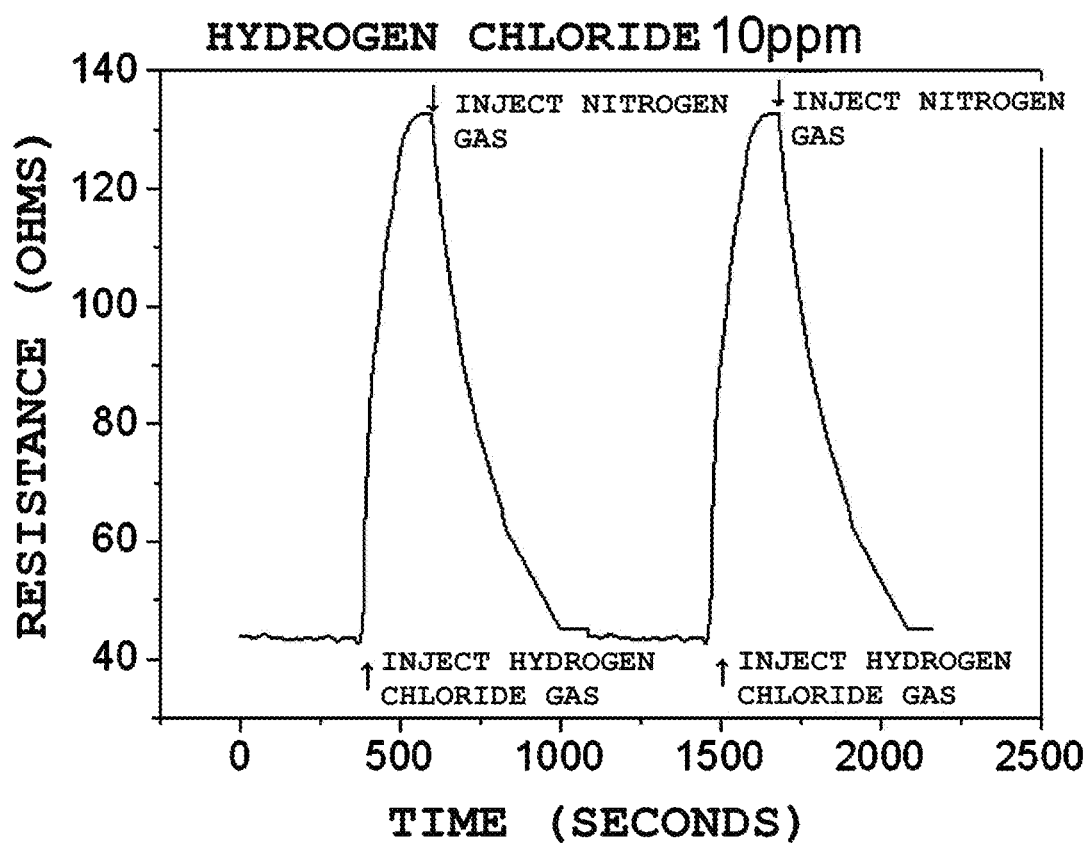
FIG. 7 is a graph illustrating the change in the resistance value when a sensor having a sensing portion formed from an integrated polyaniline binder composition obtained in an embodiment of the present invention is reacted with hydrogen chloride.

As is clear from FIGS. 5 and 6, by observing the electrical reaction of the resistance sensor in real time, it may be confirmed that the resistance sensor of the present invention is capable of sensing ammonia and hydrogen chloride gas.

Experimental Example 6

The corrosion rates of the anticorrosive conductive copper plate and conductive zinc plate produced in Examples 20 and 21 were measured by means of an electrochemical method. A Tafel plot was calculated using a 0.1 M sodium sulfate (Na2SO4) electrolyte, and the protection efficiency was calculated therefrom.

The anticorrosive conductive copper plate and conductive zinc plate on which a coating layer was formed exhibited protection efficiencies of 31% and 68%, respectively, and through this, the anticorrosive effect of the coating layer formed from the anticorrosive coating composition comprising the integrated conductive polymer binder composition of the present invention as an active component was confirmed. Therefore, an anticorrosive metal product provided with the coating layer formed from the anticorrosive coating composition of the present invention can be used in a particular solution and environment while maintaining the electrical conductivity, and thus may be applied in various ways throughout the industry and is expected to be widely applicable.

Above, an embodiment of the present invention was described in detail, but the scope of the present invention is not limited thereto, and various changes and modifications made using the basic concepts of the present invention by a person with ordinary skill in the art are also within the scope of the present invention.

The invention claimed is:

1. An integrated conductive polymer binder composition consisting of:
   99 wt % to 99.7 wt % of a conductive polymer solution; and
   0.3 wt % to 1 wt % of an organic compound that has multiple polar groups,
   wherein the conductive polymer solution consists of:
      0.01 wt % to 60 wt % of a conductive polymer, selected from the group consisting of polypyrrole and polyaniline;
      0.01 wt % to 60 wt % of an alkyl group-substituted aromatic organic acid compound consisting of camphorsulfonic acid (CSA) and dodecylbenzene sulfonic acid (DBSA); and
      a remainder of solvent, wherein the solvent is an organic solvent selected from the group consisting of N-methylpyrrolidone (NMP) and m-cresol; and
   the organic compound is at least one selected from the group consisting of D-sorbitol, L-arabitol, and maltitol.

2. The integrated conductive polymer binder composition of claim 1, wherein the conductive polymer is polyaniline; the organic solvent is N-methylpyrrolidone (NMP); and the organic compound is D-sorbitol.

3. The integrated conductive polymer binder composition of claim 1, wherein the conductive polymer is polyaniline; the organic solvent is N-methylpyrrolidone (NMP); and the organic compound is maltitol.

4. The integrated conductive polymer binder composition of claim 1, wherein the conductive polymer is polypyrrole; the organic solvent is m-cresol; and the organic compound is L-arabitol.

* * * * *